Patented Oct. 24, 1922.

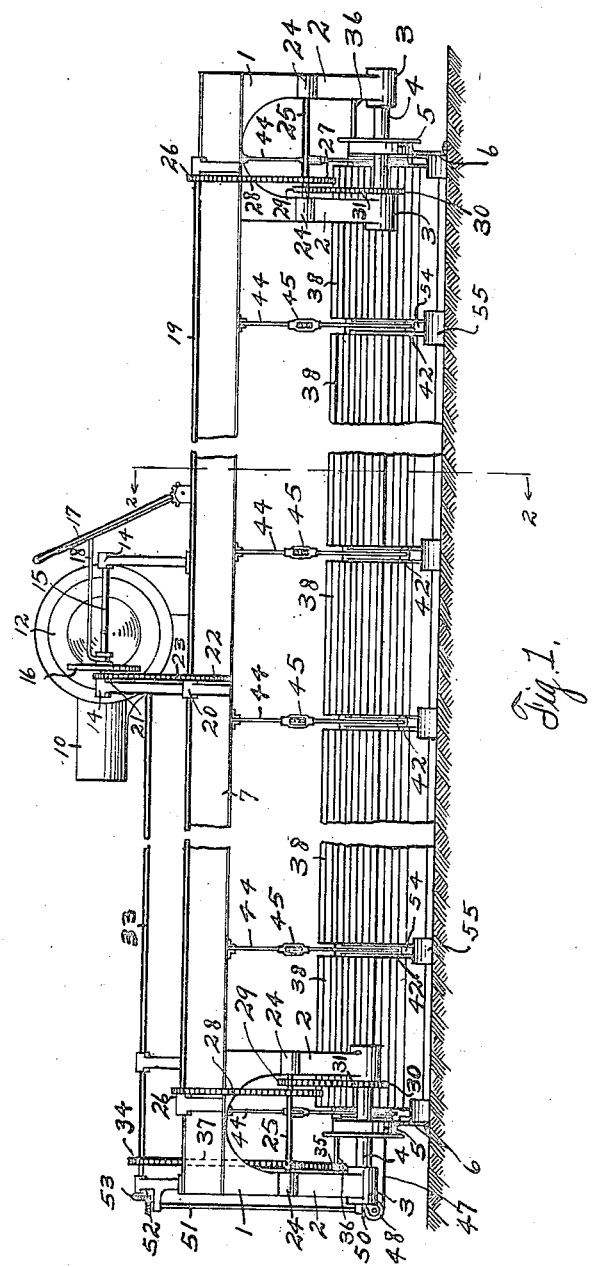

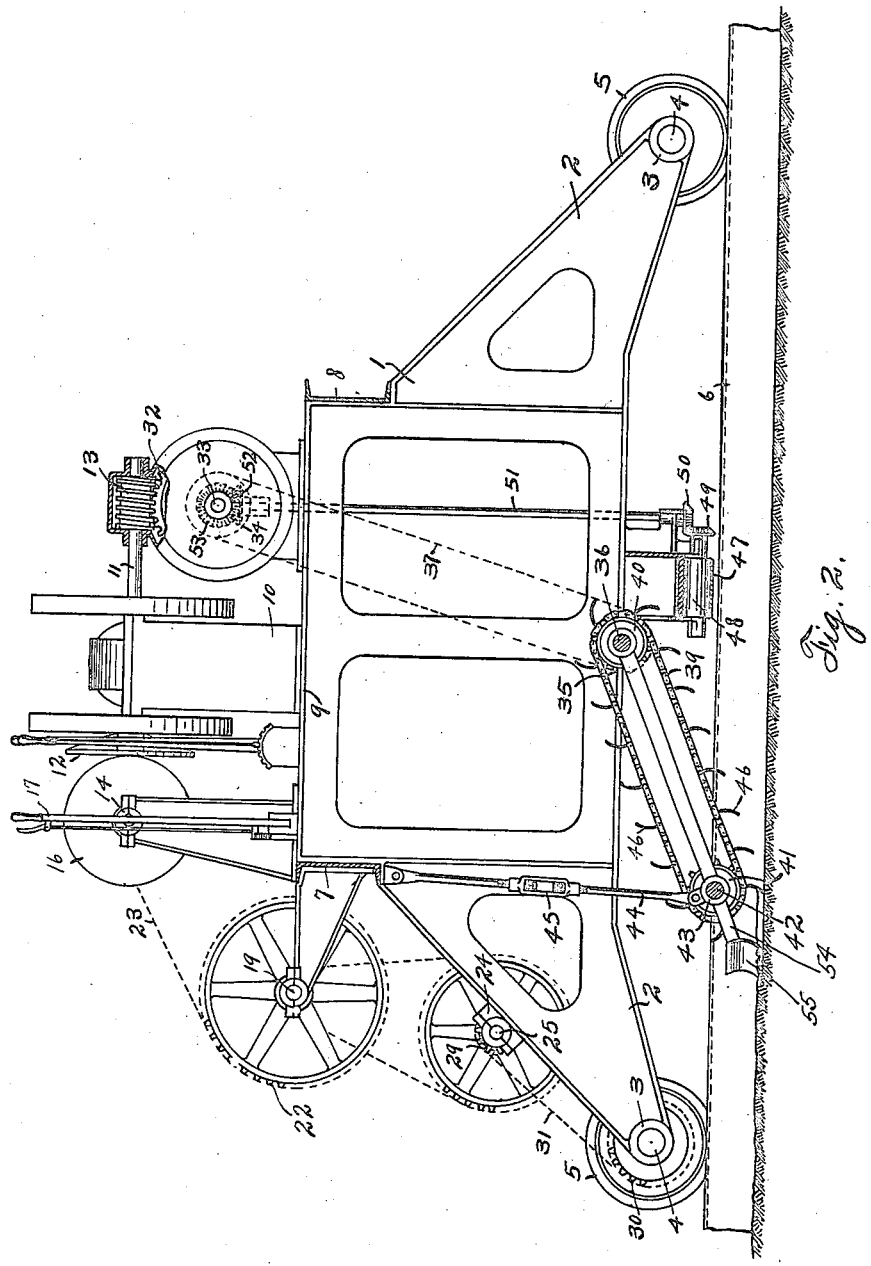

1,432,906

UNITED STATES PATENT OFFICE.

ROBERT E. REYNOLDS, OF NEW ORLEANS, LOUISIANA.

GRADING MACHINE.

Application filed November 10, 1919, Serial No. 337,080. Renewed March 28, 1922. Serial No. 547,543.

*To all whom it may concern:*

Be it known that ROBERT E. REYNOLDS, citizen of the United States, residing at New Orleans, in the parish of Orleans and State of Louisiana, has invented certain new and useful Improvements in a Grading Machine, of which the following is a specification.

This invention relates to new and useful improvements in a grading machine.

One object of the invention is to provide a machine of the character described, which has been specially designed for the purpose of grading road beds, whereby the loose earth may be quickly and easily removed and the bed left smooth and of the proper contour to receive road building material.

Another object of the invention is to provide a grader of the character described, which is adjustable, so as to give the road bed when finished any desired contour.

A further feature of the invention is to provide a grading machine, which deposits material taken from the bed along the side thereof to an accessible place for the disposition of said material.

A still further feature of the invention resides in the provision of a machine of the character described, which is of simple construction, which may be cheaply and easily manufactured as well as easily operated.

With the above and other objects in view, the invention has particular relation to certain novel features of construction, operation and arrangement of parts, an example of which is given in this specification and illustrated in the accompanying drawings, wherein:—

Figure 1, is a front elevation of the grader, and

Figure 2, is a sectional view, taken on the line 2—2, of Figure 1.

Referring now more particularly to the drawings, wherein like numerals of reference designate similar parts in each of the figures, the numerals 1, 1, refer to the end castings of the frame work, the opposite ends of each of which are formed into the legs 2, 2. The free ends of these legs are formed into alined bearings 3, 3, wherein the shafts 4, 4, respectively rotate and mounted on these shafts are the supporting wheels 5, 5 formed to move upon the track 6. The end castings are connected by the side members 7 and 8, preferably formed of channel irons, which together with the end cross beams 9 form the frame work of the machine.

Mounted upon this frame work is a suitable motor 10, having a drive shaft 11. Fixed upon one end of this shaft, is the friction wheel 12, and upon the other end there is the screw gear 13. Fixed upon the front side of the frame work are the bearings 14, 14, in which the shaft 15 rotates and splined upon this shaft there is the friction wheel 16. This friction wheel may be shifted toward and from the center of the friction wheel 12, so as to decrease or increase the speed of rotation thereof and may be shifted from one side to the other of said friction wheel 12, so as to reverse the rotation of said wheel 16, this shifting being accomplished through the instrumentality of a hand lever 17, which is connected to the hub of friction wheel 16, through the instrumentality of a shifting rod 18. A long counter shaft 19 is mounted in suitable bearings carried by the respective castings 1, 1, and is also provided with a central bearing 20, carried by the side member 7.

Fixed upon the shaft 15 is a sprocket wheel 21 and in alinement therewith there is the sprocket wheel 22, which is fixed upon the shaft 19 and operating over said sprocket wheels and transmitting rotation from the former to the latter, is the sprocket chain 23. The legs 2, 2, have alined bearings 24, 24, wherein rotate the short shafts 25, 25. Fixed upon the respective ends of the counter shaft 19, are the small sprocket wheels 26, 26, in alignment with the large sprocket wheels 27, 27, which are fixed upon the shafts 25, and operating over these sprocket wheels and transmitting rotation from the former to the latter are the sprocket chains 28, 28. Each shaft 25 has a small sprocket wheel 29, fixed thereon and in alignment with a large sprocket wheel 30, which is fixed upon the corresponding shaft 4, and operating over these sprocket wheels and transmitting rotation from the former to the latter are the sprocket chains 31.

It is obvious that the speed of the traction mechanism hereinafter described may be varied and the movement thereof reversed by shifting the friction wheel 16, back and forth on its shaft 15 through the instrumentality of the hand lever 17.

The screw gear 13 is in mesh with a large screw gear 32, which is fixed on the shaft 33, and the shaft is rotatable in suitable bearings carried by the frame work and has a small sprocket wheel 34, fixed thereon and in alignment with the corresponding sprocket wheel 35, which is fixed upon the transverse shaft 36, mounted in suitable bearings carried by the end castings 1. Operating over the sprocket wheels 34, and 35, and transmitting rotation from the former to the latter is the sprocket chain 37, through which rotation is imparted to the shaft 36.

The shaft 36 drives the endless aprons 38, which are provided with the marginal sprocket chains 39, secured to the respective edges of said aprons and sprocket wheels 40 are fixed to said shaft and spaced thereon so as to mesh with and drive the respective chains 39. These aprons are located underneath the frame work and decline forwardly and their edge chains operate over corresponding sprocket wheels 41, which are fixed upon the short aligned shaft 42. The ends of these shafts are journaled in bearing blocks 43, which are provided with bearings to receive them and said blocks are supported from the frame work by means of the supporting rods 44, which are fastened at their upper ends to the frame work and at their lower ends to said blocks and these rods are provided with the turn buckles 45, by means of which they may be lengthened and shortened and the lower ends of the aprons 38 thereby adjusted relative to the surface of the road bed. The aprons 38 carry the transverse arcuate scrapers 46 which are spaced apart and gather up the earth to be removed and the material so gathered up is carried upwardly along said aprons and deposited on the side delivery conveyor 47. This conveyor is preferably of the form of an endless belt and travels over rollers as 48, which are rotatably mounted in bearings depending from the frame work. The end roller has a pinion 49 fixed to the shaft thereof and in mesh with the corresponding pinion 50, fixed upon the lower end of the vertical shaft 51. The upper end of this shaft has a pinion 52, fixed thereon and in mesh with a corresponding pinion 53, carried by the outer end of the shaft 33. Through the mechanism described, the conveyor 47 is driven and the material delivered to it by the aprons 39, is thus delivered alongside of the road.

The aprons 39, it will be observed are spaced a short distance apart. Projecting forwardly from the bearing blocks 43 are the arms 54, attached to the forward ends of which are the shares 55, angularly disposed, relative to the line of travel of the machine. These shares are provided for the purpose of throwing loose earth from in front of said space, so that it will come within the range of the scrapers 46 and thus present a smooth finished surface after the grader has passed thereover.

In the process of grading a road, the surface is first usually ploughed and the main body of the material to be removed is removed by the ordinary scraper in common use. The tracks 6 are then placed in position and the grading machine herein described is then passed over the surface to remove the remaining loose material and to give the road bed the desired contour and to prepare it for the road building material.

What I claim is:—

1. A road grader including a supporting framework, a traction mechanism for propelling the grader, a side delivery conveyor, means for driving said conveyor, a transverse drive shaft, endless aprons operating over, and declining forwardly from said shaft, alined idler shafts over which the forward ends of said aprons operate and by means of which they are supported, means for adjusting said idler shafts and transverse scrapers carried by said aprons and spaced apart and provided to gather up loose material which is delivered by said aprons to said conveyor.

2. A grader for roads and the like, including a supporting framework, a traction mechanism for propelling the grader, a transverse endless belt forming a conveyor, means for driving said conveyor, endless aprons mounted underneath the frame work, means for driving the same, scrapers spaced apart along said aprons and adapted to gather up loose material from the road bed, which is carried by said aprons and delivered to said conveyor, and means for adjusting the positions of the aprons relative to the roadway.

3. A road grader, including a supporting frame work, a traction mechanism for propelling the grader, a side delivery conveyor, endless aprons mounted to travel lengthwise of the grader, and provided with scrapers, adapted to gather up material from the roadway and deliver the same to said conveyor and means for adjusting said aprons vertically.

In testimony whereof I have signed my name to this specification in the presence of two subscribing witnesses.

ROBERT E. REYNOLDS.

Witnesses:
F. A. WALLIOR,
ROY DE BARBIERIS.